July 21, 1942.  R. L. OHLS  2,290,349
VALVE
Filed July 9, 1940

Robert L. Ohls.
INVENTOR.
By J. Vincent Martin
and
Ralph H. Browning.
ATTORNEYS

UNITED STATES PATENT OFFICE 2,290,349

VALVE

Robert L. Ohls, Houston, Tex., assignor to Reed Roller Bit Company, Houston, Tex., a corporation of Texas Application July 9, 1940, Serial No. 344,478

6 Claims. (Cl. 251—113)

This invention relates to valves and has for its general object the provision of a valve which may be used in connection with gritty or abrasive fluids under high pressures or velocities.

It is a well-known fact that in the handling of gritty or abrasive fluids under high pressures valves of ordinary construction are very quickly eaten away by the action of the fluid and are thus very short-lived. It is further well-known that under many circumstances valves of ordinary construction are ineffective to provide a perfect seal for such liquids.

The reason for the ineffectiveness of valves of the usual construction is that such valves ordinarily seat with a metal to metal contact between the closure member and the valve seat. During the closing operation the velocity of flow under high pressure between these seating surfaces becomes very great and the wear upon the surfaces from this cause rapidly deteriorates the surfaces. Also, where the fluid contains grit of substantial size, such particles of grit are frequently caught between the seating surfaces when the valve is closed, and this grit not only damages the surfaces but holds the surfaces apart slightly so that a small amount of liquid may flow therebetween at high pressures. The effect of such flow is extremely damaging to the seating surfaces.

It is an object of this invention to provide a valve in which the closure member may seat perfectly to form a perfect seal despite the presence of gritty substances in the liquid being handled and the possible presence of such substances between the seating surfaces.

Another object of this invention is to provide a valve of the character described in which there will be a minimum tendency for the seating surfaces of the valve to become eroded during the opening and closing operations and in which no erosion will take place while the valve is in closed position.

Another object of this invention is to provide a means whereby a valve seat member of desirable construction may be firmly anchored in proper position within a valve body.

Another object of this invention is to provide a valve seat member, which will form a seal with those portions of the valve with which it is brought into contact despite the presence of gritty material between the seating surfaces.

Another object of this invention is to provide such a valve seat member, which will have a substantial amount of inherent strength.

Another object of this invention is to provide such a valve seat member, which may be easily and readily replaced.

Another object is to provide such a valve seat member, which will offer greater resistance to erosion than a member constructed in the usual manner.

Other objects and advantages of this invention will become apparent from the following description taken in connection with the accompanying drawing, wherein is set forth by way of example one embodiment of the invention.

Figure 1:
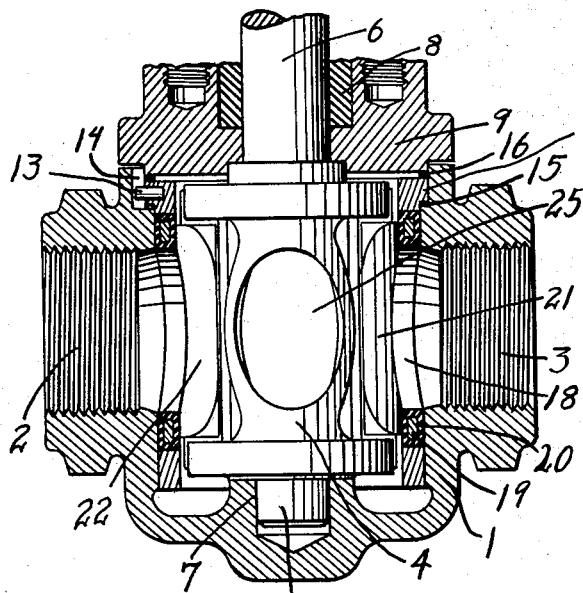
Fig. 1 shows a vertical longitudinal across section through a valve constructed in accordance with this invention.
Figure 2:
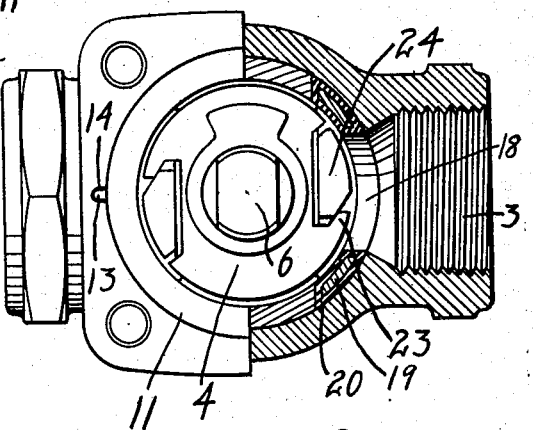
Fig. 2 is a view partly in top plan and partly in longitudinal horizontal cross section showing the valve illustrated in Fig. 1.
Figure 3:
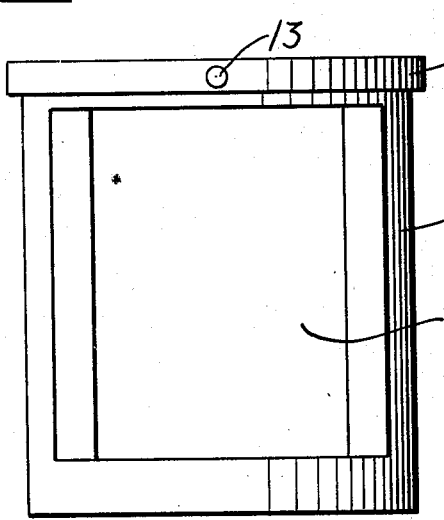
Fig. 3 is a side elevation of the liner for the valve body shown in Fig. 1.
Figure 4:
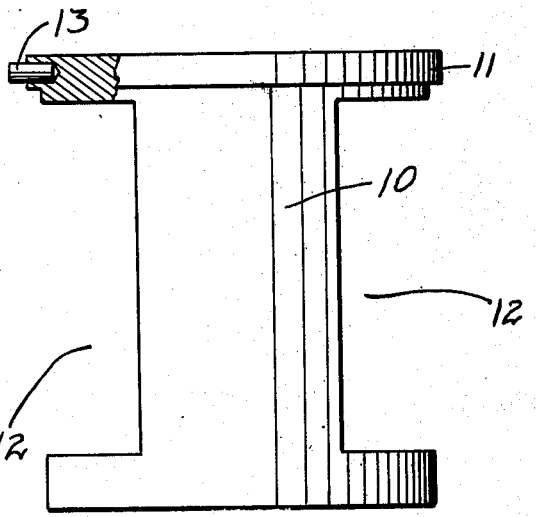
Fig. 4 is a side elevation of the same liner as shown in Fig. 3 but taken at right angles to Fig. 3.
Figure 5:
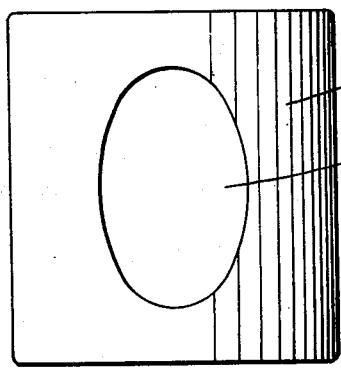
Fig. 5 is a side elevation of a valve seating member constructed in accordance with this invention.
Figure 6:
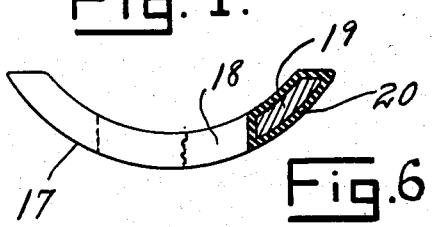
Fig. 6 is an end view of the same member, parts being broken away and shown in transverse cross section.

In Fig. 1 the numeral 1 indicates the body of the valve, which has fluid flow openings 2 and 3, either of which may serve as the inlet with the other serving as the outlet.

Extending transversely through the body 1 is a valve chamber adapted to receive the valve carrier 4. This carrier 4 has a projecting bearing pin 5 at one end and a valve stem 6 projecting from the body 1 at the other end. The bearing pin 5 is journaled in a suitable socket 7 in the body 1, while the stem 6 passes out through the stuffing box 8 in the bonnet or cover 9.

The interior of the valve chamber is provided with a liner 10 having a laterally extending flange 11 at its upper edge and cut-out portions 12 in its opposite sides for a purpose presently to be set forth. On one side the flange 11 is provided with a pin 13, which acts as a key and fits within a short keyway 14 in the body 1 to prevent the liner 10 from turning in the body. Beneath the flange 11 is a sealing ring 15 and on top of the flange 11 is a second sealing ring 16. The bonnet 9 rests on the ring 16 and is held down by bolts (not shown) in the usual manner.

The openings 12 in the liner 10 are so positioned as to overlie the fluid flow openings 2 and 3, but the openings 12 are much larger than the openings 2 and 3 and are adapted to receive valve seat members 17, having openings 18 therein of the same size and shape as the inner ends of the fluid flow openings 2 and 3. These valve seat members are adapted to fit the openings 12 and in substance to form continuations of liner 10 except, of course, for the openings 18. Each valve seat member is constructed with a substantially rigid metal or other core 19 covered with some relatively soft material, such as rubber, 20 or the like.

The carrier 4 is provided on its opposite sides with valve closure segments 21 and 22 adapted to seat against the respective valve seat members in closing the valve. The carrier is also provided with hook-shaped parts 23 adapted to engage lugs 24 on the respective closure segments so that when an opening movement of the valve carrier begins these hook-shaped parts 23 will pull the valve segments away from their seats prior to moving them toward open position. The carrier 4 is provided with an opening 25 therethrough, which is adapted to register with the openings 18 through the valve seat members when the carrier is in open position.

From the foregoing, it will be seen that the valve seat members 17 will be firmly and positively retained in their proper position yet may be easily replaced by mere removal of the liner 10 from the valve body. The liner 10 may likewise be replaced whenever desired with very little difficulty.

It will be seen furthermore that the valve seat members 17 due to the presence of the core 19 will have in themselves a substantial amount of strength so as to be able to remain in their proper positions under stresses and pressures, yet the surfaces of these members are of soft rubber or some similar material, so that in the event any gritty or abrasive matter remains between this valve seat member and one of the closure members 21 and 22 when the valve is closed, such abrasive and gritty material will be pressed into the soft material of the seat member and a perfect seal will be formed. In fact, the seat member is provided with such a coating 20 preferably over substantially its entire surface so that it will form a seal with respect to the body 1 as well as with respect to the closure members 21 and 22.

It is further to be noted that the soft material of the valve seat members is preferably of such a nature as to resist abrasion to a greater degree than would a hard material, this being a well-known property of certain forms of rubber and various rubber substitutes.

It will be seen also that in the arrangement shown in the drawing the valve seat members are so mounted and formed that there are no free edges of the soft sealing material against which the liquid under high pressure and at high velocities might act in ripping off such seat member.

Having described my invention, I claim:

1. In a valve construction a valve body having a cylindrical bore therein providing a valve chamber, said body having flow ports therein for the flow of fluid into and out of said chamber, a cylindrical sleeve extending axially substantially throughout the length of said bore and snugly fitted therein, said sleeve having openings therein intermediate its ends larger than the flow ports in the body and overlying said flow ports, segmental seating members of resilient material having a peripheral configuration corresponding to that of the openings in the sleeve and mounted in said sleeve openings with the periphery of the sleeve openings completely surrounding the periphery of the seating members and with edges of the sleeve openings overlying corresponding edges of the segmental resilient seating members to retain the segmental seating members in sealing contact with the bore, said segmental seating members having flow openings registering with the flow ports, and a ported plug rotatably mounted in said bore and having closure surfaces adapted to make sealing contact with the inner surfaces of the segmental seating members.

2. In a valve construction a valve body having a cylindrical bore therein providing a valve chamber, said body having flow ports therein for the flow of fluid into and out of said chamber, a cylindrical sleeve extending axially substantially throughout the length of said bore and snugly fitted therein, said sleeve having rectangular openings therein intermediate its ends larger than the flow ports in the body and overlying said flow ports, each of said rectangular openings having two of its edges extending longitudinally of the sleeve and lying in a plane forming a chord with said sleeve, segmental seating members of resilient material each having a peripheral configuration corresponding to that of said sleeve openings and having a pair of edges lying in the same chordal plane as the corresponding edges of the rectangular sleeve openings, seated in said sleeve openings with the chordal plane edges of the segmental members lying in engagement with the corresponding edges of the sleeve opening and thereby holding the segmental members in sealing contact with the wall of the bore, said segmental seating members having flow openings registering with the flow ports, and a ported plug rotatably mounted in said bore and having closure surfaces adapted to make sealing contact with the inner surfaces of the segmental seating members.

3. In a valve construction a valve body having a cylindrical bore therein providing a valve chamber, said body having flow ports therein for the flow of fluid into and out of said chamber, a cylindrical sleeve extending axially substantially throughout the length of said bore and snugly fitted therein, said sleeve having openings therein intermediate its ends larger than the flow ports in the body and overlying said flow ports, segmental seating members of resilient material having a peripheral configuration corresponding to that of the openings in the sleeve and mounted in said sleeve openings with the periphery of the sleeve openings completely surrounding the periphery of the seating members and with edges of the sleeve openings overlying corresponding edges of the segmental resilient seating members to retain the segmental seating members in sealing contact with the bore, said segmental seating members having flow openings registering with the flow ports, a ported plug rotatably mounted in said bore and having closure surfaces adapted to make sealing contact with the inner surfaces of the segmental seating members, and reinforcing elements of relatively rigid material in said segmental seating members.

4. In a valve construction a valve body having a cylindrical bore therein providing a valve chamber, said body having flow ports therein for the flow of fluid into and out of said chamber, a cylindrical sleeve extending axially substantially throughout the length of said bore and snugly fitted therein, said sleeve having openings therein intermediate its ends larger than the flow ports in the body and overlying said flow ports, segmental seating members of resilient material having a peripheral configuration corresponding to that of the openings in the sleeve and mounted in said sleeve openings with the periphery of the sleeve openings completely surrounding the periphery of the seating members, said segmental seating members having flow openings registering with the flow ports, a carrier rotatably mounted in said bore, and closure elements carried by the carrier and retractable from engagement with the segmental seating members, the edge faces of the openings in the sleeve cooperating with and overlying the corresponding edge faces of the segmental members of seating material to maintain said segmental members against the wall of said chamber, even upon retraction of the closure elements.

5. In a valve construction a valve body having a cylindrical bore therein providing a valve chamber, said body having flow ports therein for the flow of fluid into and out of said chamber, a cylindrical sleeve extending axially substantially throughout the length of said bore and snugly fitted therein, said sleeve having rectangular openings therein intermediate its ends larger than the flow ports in the body and overlying said flow ports, each of said rectangular openings having two of its edges extending longitudinally of the sleeve and lying in a plane forming a chord with said sleeve, segmental seating members of resilient material each having a peripheral configuration corresponding to that of said sleeve openings and having a pair of edges lying in the same chordal plane as the corresponding edges of the rectangular sleeve openings, seated in said sleeve openings with the chordal plane edges of the segmental members lying in engagement with the corresponding edges of the sleeve opening and thereby holding the segmental members in sealing contact with the wall of the bore, said segmental seating members having flow openings registering with the flow ports, and a ported plug rotatably mounted in said bore and having closure surfaces adapted to make sealing contact with the inner surfaces of the segmental seating members, and reinforcing elements of relatively rigid material in said segmental seating members.

6. In a valve construction a valve body having a cylindrical bore therein providing a valve chamber, said body having flow ports therein for the flow of fluid into and out of said chamber, a cylindrical sleeve extending axially substantially throughout the length of said bore and snugly fitted therein, said sleeve having rectangular openings therein intermediate its ends larger than the flow ports in the body and overlying said flow ports, each of said rectangular openings having two of its edges extending longitudinally of the sleeve and lying in a plane forming a chord with said sleeve, segmental seating members of resilient material each having a peripheral configuration corresponding to that of said sleeve openings and having a pair of edges lying in the same chordal plane as the corresponding edges of the rectangular sleeve openings, seated in said sleeve opening, said segmental seating members having flow openings registering with the flow ports, a carrier rotatably mounted in said bore, and closure elements carried by the carrier and retractable from engagement with the segmental seating members, the edge faces of the openings in the sleeve cooperating with and overlying the corresponding edge faces of the segmental members of seating material to maintain said segmental members against the wall of said chamber, even upon retraction of the closure elements.

ROBERT L. OHLS.